March 10, 1942.  J. L. HEROLD ET AL  2,275,433
CONVEYING APPARATUS
Filed Jan. 18, 1940   5 Sheets-Sheet 3

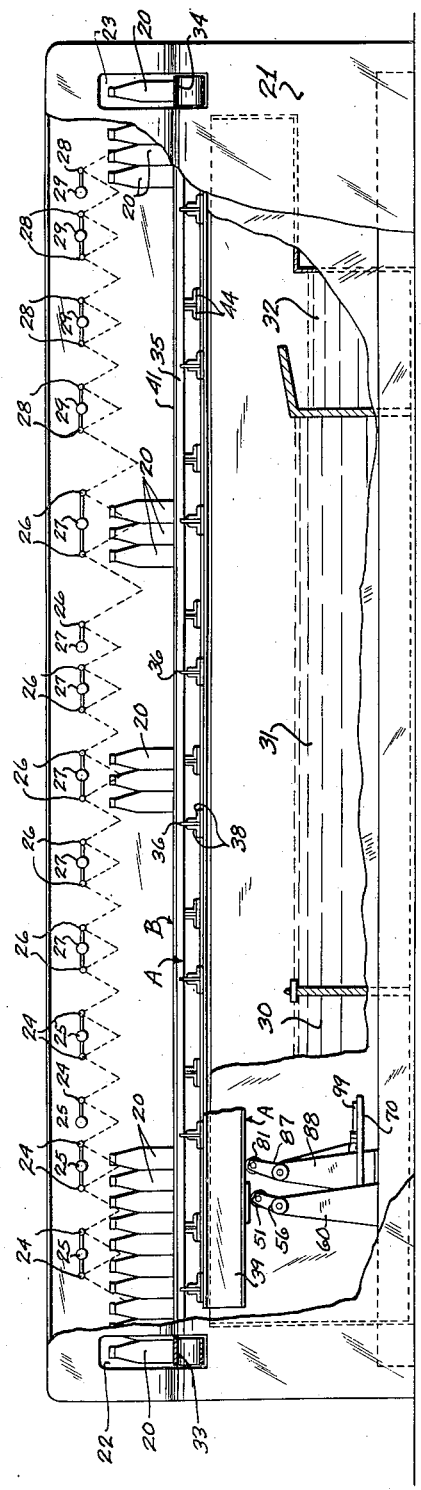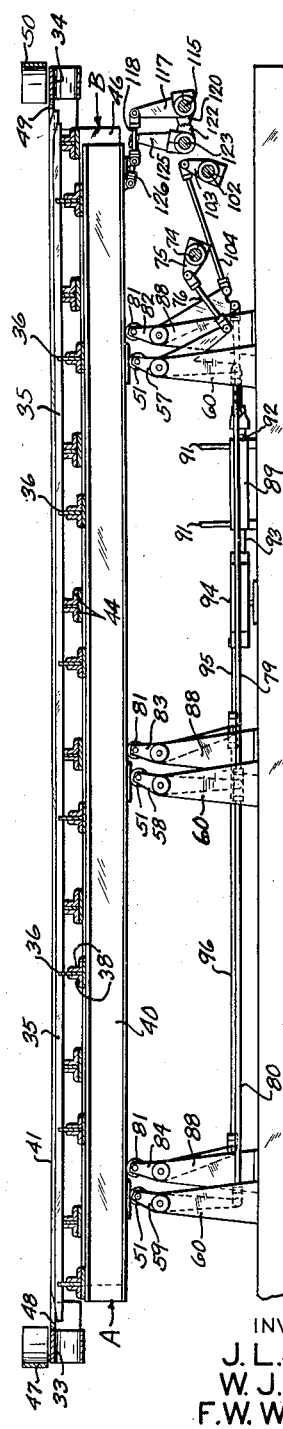

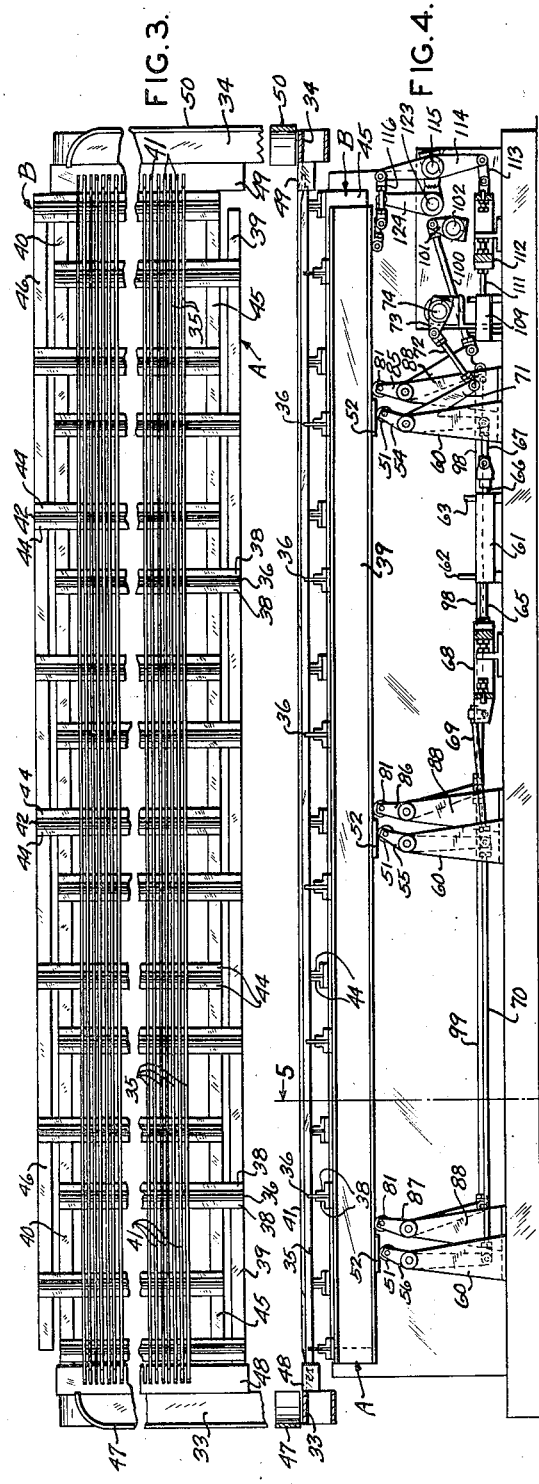

INVENTOR
J. L. HEROLD
W. J. NEKOLA
F. W. WEHMILLER
BY Albert J. McCauley
ATTORNEY

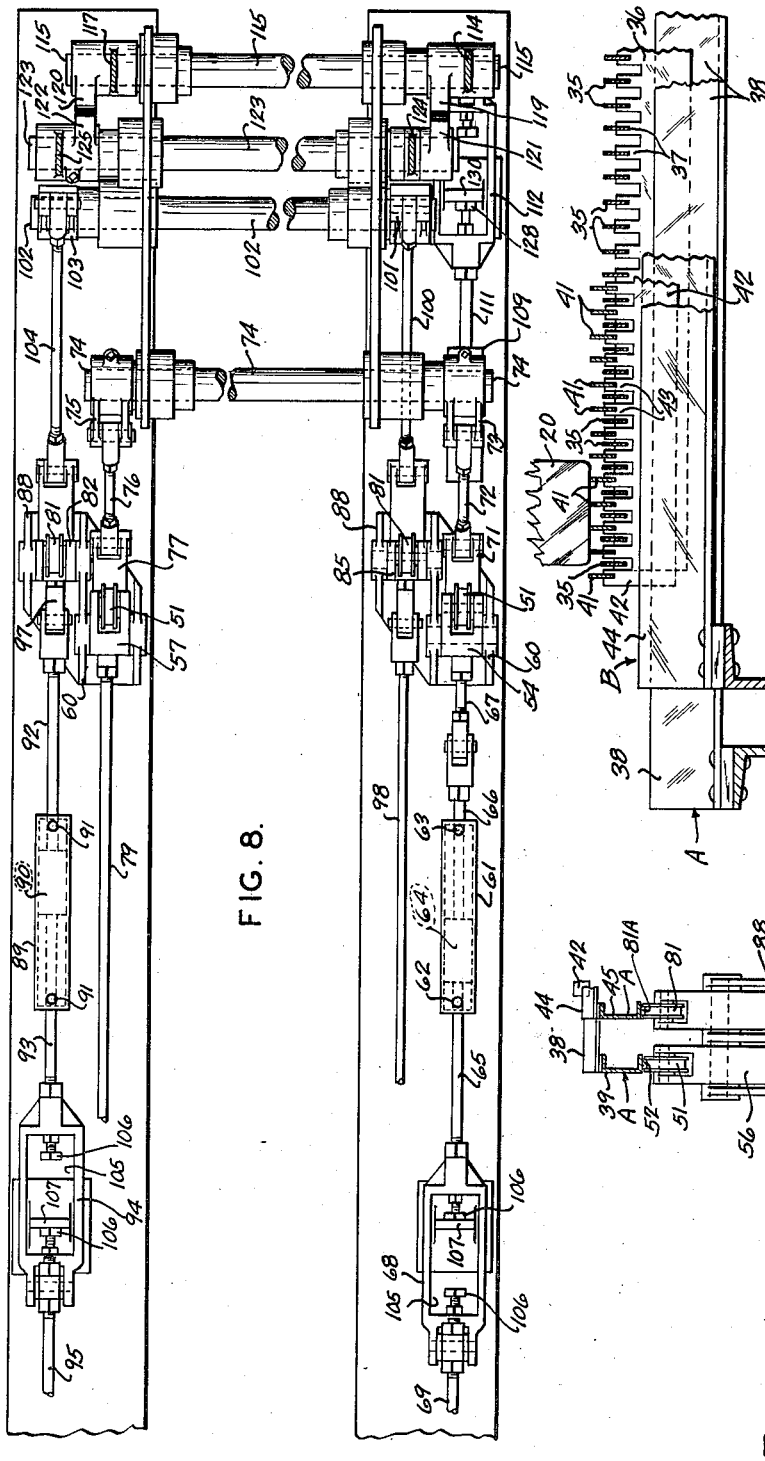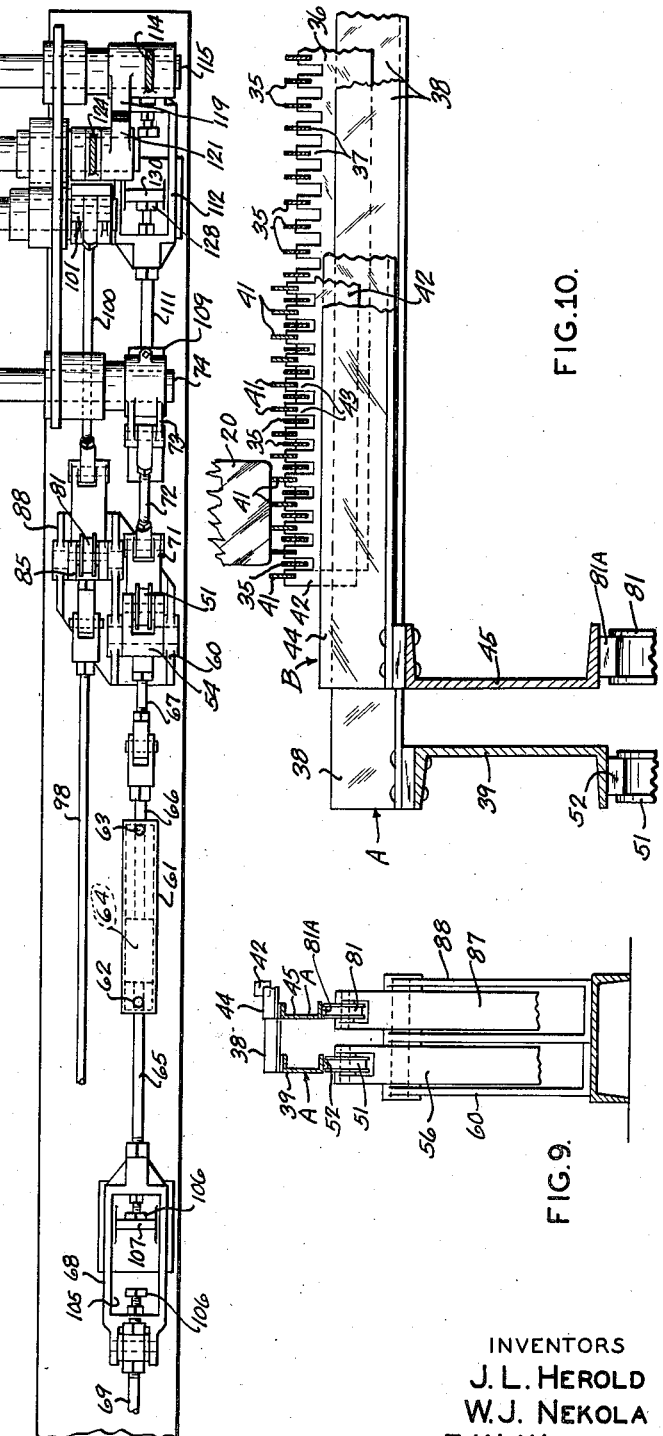

March 10, 1942.   J. L. HEROLD ET AL   2,275,433
CONVEYING APPARATUS
Filed Jan. 18, 1940   5 Sheets-Sheet 5
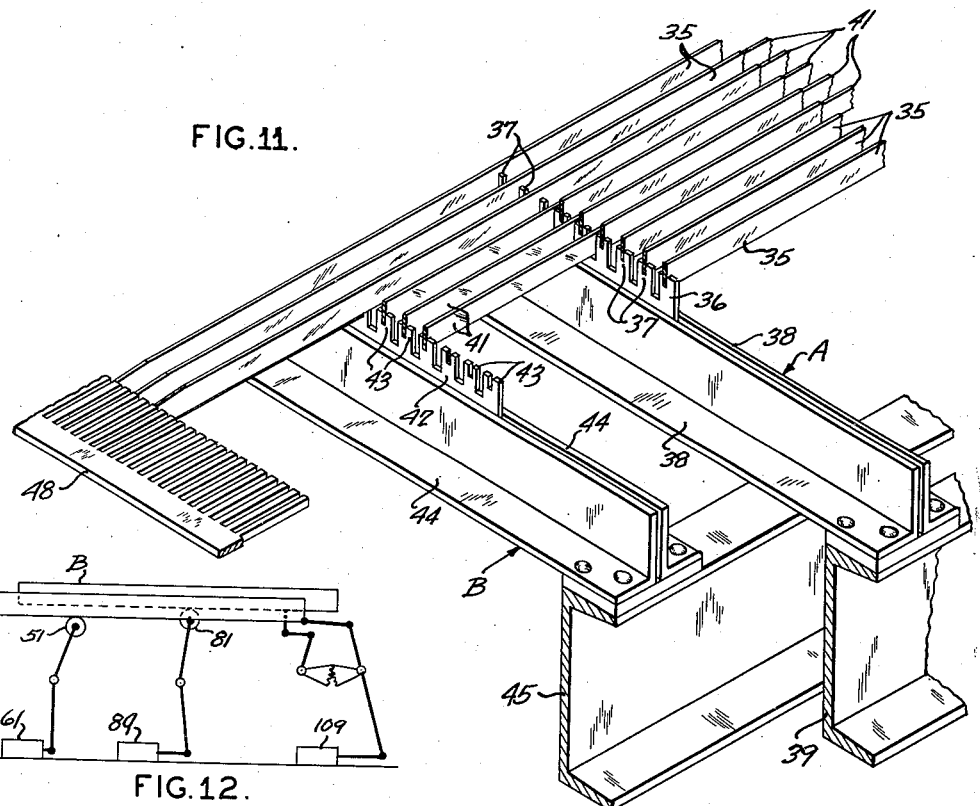
FIG. 11.
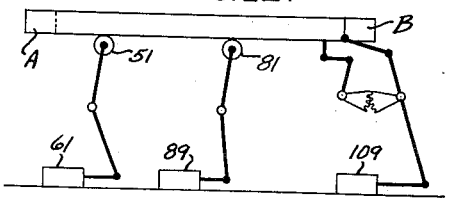
FIG. 12.
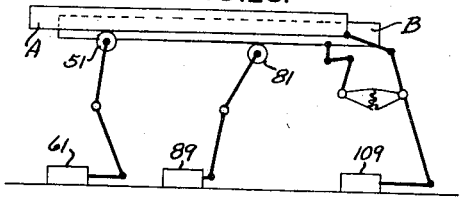
FIG. 13.
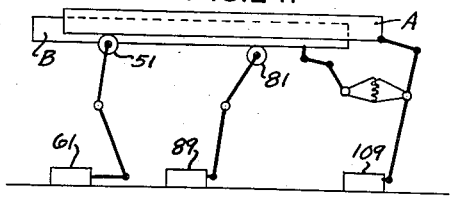
FIG. 14.
FIG. 15.
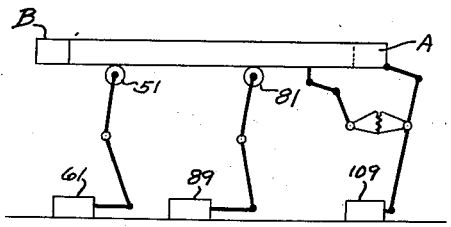
FIG. 16.
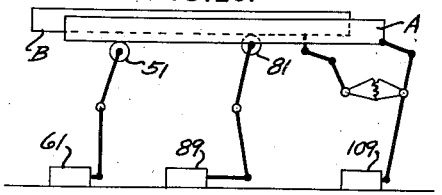
FIG. 17.
INVENTORS
J. L. HEROLD
W. J. NEKOLA
F. W. WEHMILLER
BY Albert J. McCauley
ATTORNEY Patented Mar. 10, 1942

2,275,433

UNITED STATES PATENT OFFICE 2,275,433

CONVEYING APPARATUS

James L. Herold and William J. Nekola, St. Louis, and Frederick W. Wehmiller, Ladue, Mo., assignors to Barry-Wehmiller Machinery Company, St. Louis, Mo., a corporation of Missouri Application January 18, 1940, Serial No. 314,388

5 Claims. (Cl. 198—219)

This invention relates to conveying apparatus, and more particularly to a conveyor having a plurality of supports movable in endless cycles to alternately advance the articles.

One of the objects of this invention is to produce a conveyor of this type which transmits the articles in a substantially straight plane without alternately raising and lowering said articles.

Another object of this invention is to provide a conveyor adapted to efficiently transmit articles through zones of different temperatures without causing undesirable variations in the temperatures of the conveying members for moving the articles through said zones.

With the foregoing and other objects in view, the invention comprises the novel construction, combination and arrangement of parts hereinafter more specifically described and shown in the accompanying drawings, which illustrate one form of the invention. However, it is to be understood that the invention comprehends changes, variations and modifications within the scope of the claims hereunto appended.

Fig. 1 is a side view of a pasteurizer provided with a bottle conveyor embodying features of this invention, a portion of the side wall and some of the other details being broken away.

Fig. 2 is a longitudinal section through the conveying apparatus showing the details of the driving mechanism at a side opposite to that shown in Fig. 1.

Fig. 3 is a top view of the conveying members at opposite sides of the apparatus, the middle portion being broken away.

Fig. 4 is a side view of the conveying apparatus at the side shown in Fig. 1.

Fig. 5 is a transverse section through the conveying apparatus, taken approximately on the line 5—5 in Fig. 4.

Fig. 8 is a top view of the mechanism shown in Figs. 6 and 7, the bottle-supporting members being omitted to more clearly show the details of the driving means.

Fig. 9 is an enlarged view of the details at the left portion of Fig. 5.

Fig. 10 is an enlarged fragmentary section showing details of the supports on which the bottles are alternately supported and advanced.

Fig. 11 is an enlarged fragmentary perspective view of the details of the bottle-supports.

Figs. 12 to 17 are diagrammatical views illustrating various positions of the supports which advance the bottles step by step.

Figure 6:
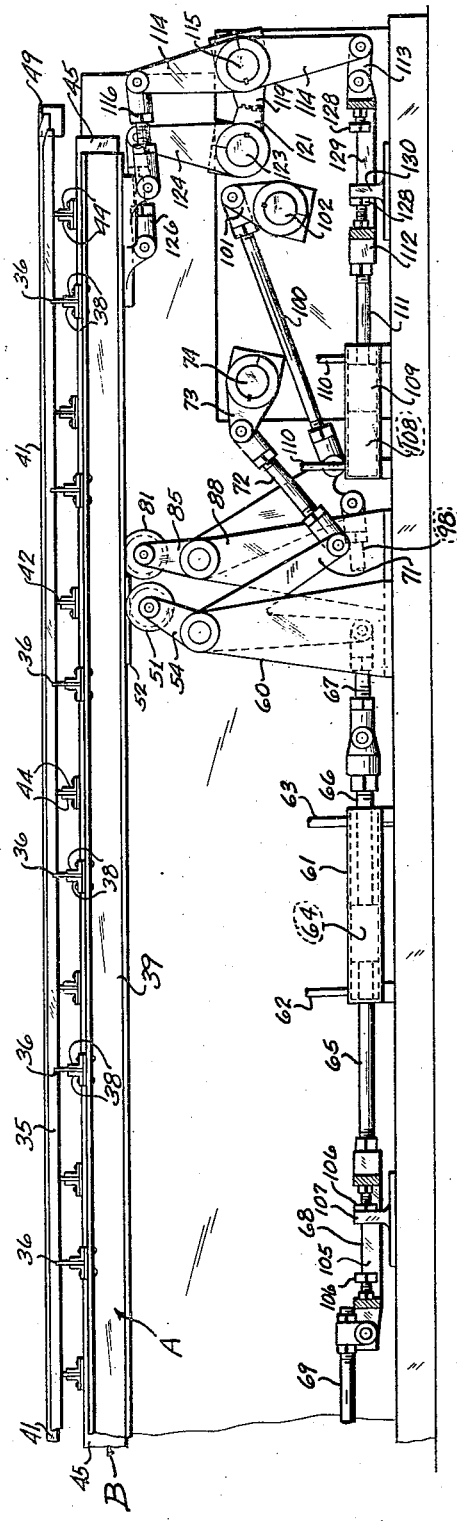
Fig. 6 is an enlarged fragmentary side view of the details of the apparatus shown at the right hand portion of Fig. 4.

To illustrate our invention, we have shown an apparatus for transmitting articles, such as bottles 20 through a pasteurizer.

The pasteurizer, as shown in Fig. 1, includes an elongated housing 21 having an entrance 22 and an outlet 23. The bottles, as they pass through the pasteurizer from its entrance to its outlet, are successively subjected to sprays of liquid at preheating, pasteurizing and cooling temperatures.

The relatively cool bottles entering the housing may be first subjected to sprays of preheating liquid from nozzles 24 connected to headers 25. The bottles are then subjected to sprays of liquid at a pasteurizing temperature discharged from nozzles 26 which are connected to headers 27. The bottles, after passing under the sprays of liquid at a pasteurizing temperature, may be cooled by sprays of liquid discharged from nozzles 28 connected to headers 29. The various liquids sprayed onto the bottles may be separately collected in compartments 30, 31 and 32 and reused as is usual in this art. Many of the details of the pasteurizer have been omitted as they do not form a part of this invention.

The bottles 20 may enter the pasteurizer on an inlet conveyor in the form of a belt 33, and are discharged from the pasteurizer on a conveyor in the form of a belt 34.

To provide for the transmission of the bottles through the pasteurizer from the conveyor 33 to the conveyor 34, we have shown a conveying apparatus which includes supports A and B on which the bottles are alternately supported and advanced step by step in a manner hereafter described.

The support A includes a plurality of spaced bars 35 extending approximately from the conveyor 33 to conveyor 34, a series of cross supports 36 having upwardly extending fingers 37 secured to the elongated bars 35 (Figs. 10 and 11) for holding them in spaced relationship, angle bars 38 secured to opposite sides of the cross supports 36, and a pair of elongated beams 39 and 40 (Fig. 3) secured to opposite ends of the angle bars 38.

The support B is similar in construction to the support A and comprises a plurality of spaced bars 41 extending approximately from the conveyor 33 to the conveyor 34, a series of cross supports 42 having upwardly extended fingers 43 secured to the elongated bars 41 (Figs. 10 and 11), angle bars 44 secured to opposite sides of the cross supports 42, and a pair of elongated beams 45 and 46 (Fig. 3) secured to opposite ends of the angle bars 44.

As shown in Figs. 3, 10 and 11, the bars 35 of support A and the bars 41 of support B are alternately arranged with respect to each other, and have top faces on which the bottles 20 are alternately supported. Fig. 10 shows the upper bars 41 in bottle-supporting positions, the lower bars 35 being out of contact with the bottles. Fig. 11 shows the bars 35 in an upper bottle-supporting position, and the bars 41 in a lower position.

The bottles 20 entering the pasteurizer on the conveyor 33 are diverted therefrom by a deflector plate 47 which has a curved portion (Fig. 3) extending into the path of the bottles on the conveyor 33. The bottles diverted from the conveyor 33 pass over a plate 48 having spaced fingers extending between the bars 35 and 41 of the supports A and B, as shown in Figs. 3 and 11. The bottles 20 then pass onto the bars 35 and 41 of said supports and are moved step by step in a manner hereafter described toward the conveyor 34. The bottles discharged from the supports A and B pass over a plate 49 having fingers interposed between the bars 35 and 41, and then onto the discharge conveyor 34. A guide plate 50 may be arranged adjacent to the conveyor 34, as shown in Fig. 3 to prevent the bottles from passing off the conveyor 34.

In transmitting the bottles from the conveyor 33 to the discharge conveyor 34, each of the supports A and B are movable limited distances upwardly, forwardly, rearwardly and downwardly in an endless cycle.

The means for raising and lowering the support A comprises a series of rollers 51 located under and supporting each of the beams 39 and 40 at opposite sides of the support A. As shown in Figs. 5, 9 and 10, the beams 39 and 40 are provided with guide plates 52 which are seated in grooves in the rollers 51 to prevent lateral displacement of the beams with respect to the rollers.

The rollers 51 are movable simultaneously in an arcuate course to raise and lower the support A. The means for moving the rollers in said arcuate course include a series of levers 54, 55 and 56 carrying the rollers under the beam 39, and levers 57, 58 and 59 carrying the rollers under the beam 40.

The levers 54 to 59 are pivotally mounted in supports 60 and adapted to be actuated to swing the rollers 51 in an arcuate course. The means for actuating the levers 54 to 59 includes a cylinder 61 (Figs. 4 and 6) having pipes 62 and 63 through which fluid is introduced and discharged to reciprocate a piston 64. Rods 65 and 66 are connected to the piston 64 and extend from opposite ends of the cylinder 61. The rod 66 is pivotally connected to the lower portion of the lever 54 by means of a link 67. The other rod 65 is operatively connected to the levers 55 and 56 by means of a driven member 68, a rod 69 which is pivotally secured to the driven member and the lower portion of the lever 55, and a rod 70 (Fig. 4) pivotally connecting the lower portions of the levers 55 and 56.

To provide for the transmission of power to the levers 57, 58 and 59 (Fig. 2) for raising and lowering the beam 40 of the support A, the lever 54 (Figs. 4 and 6) is provided with an arm 71 pivotally connected by a link 72 to an arm 73 fixed on a shaft 74. This shaft 74 extends across the machine as shown in Fig. 8, and has an arm 75 fixed thereto. A link 76 (Figs. 2 and 7) pivotally connects the arm 75 to a lower arm 77 on the lever 57. The lever 57 also has another lower arm 78 operatively connected to the lower arms of the levers 58 and 59 by means of rods 79 and 80, as shown in Fig. 2.

It will be understood from the foregoing that as the piston 64 is reciprocated in the cylinder 61, motion will be simultaneously transmitted to all of the levers 54 to 59 to swing them on their pivotal supports and move the rollers 51 in arcuate paths. As the piston moves to the right from the position shown in Fig. 6, all of the levers 54 to 59 are actuated to raise the rollers in an arcuate course, thereby moving the support A upwardly. When the piston 64 moves back to the position shown in Fig. 6, all of the levers 54 to 59 are moved in an opposite direction to move the rollers downwardly in an arcuate course, thereby lowering the support A.

A series of rollers 81 is located under and supports each of the beams 45 and 46 at opposite sides of the support B. As shown in Figs. 5, 9 and 10, the beams 45 and 46 are provided with guide plates 81A which are located in grooves in the rollers 81 to prevent lateral displacement of the beams with respect to the rollers.

The rollers 81 for supporting the beam 46 are rotatably secured to levers 82, 83 and 84, and the rollers 81 for supporting the beam 45 are rotatably secured to levers 85, 86 and 87. Each of the levers 82 to 87 is pivotally mounted in a support 88 and adapted to be actuated to swing the rollers 81 in an arcuate course.

All of the levers 82 to 87 are operatively connected to each other and may be simultaneously actuated to raise or lower the rollers 81.

The means for actuating the levers 82 to 87 includes a cylinder 89 (Figs. 2 and 8) and a piston 90 adapted to reciprocate therein. The cylinder 89 is provided with pipes 91 near its opposite ends to provide for the admission and discharge of fluid to reciprocate said piston 90. Driving rods 92 and 93 are secured to the piston 90 and extend from opposite ends of the cylinder 89.

The rod 93 is secured to a driven member 94. A link 95 pivotally connects said driven member to the lower portion of the lever 83 which is also pivotally connected by a rod 96 (Fig. 2) to the lower portion of the lever 84. The other rod 92 extending from the piston 90 is connected by a link 97 to the lower arm of the lever 82. It will, therefore, be understood that all of the levers 82 to 84 which are under the beam 46 of the support B are actuated simultaneously by the piston 90.

Figure 7:
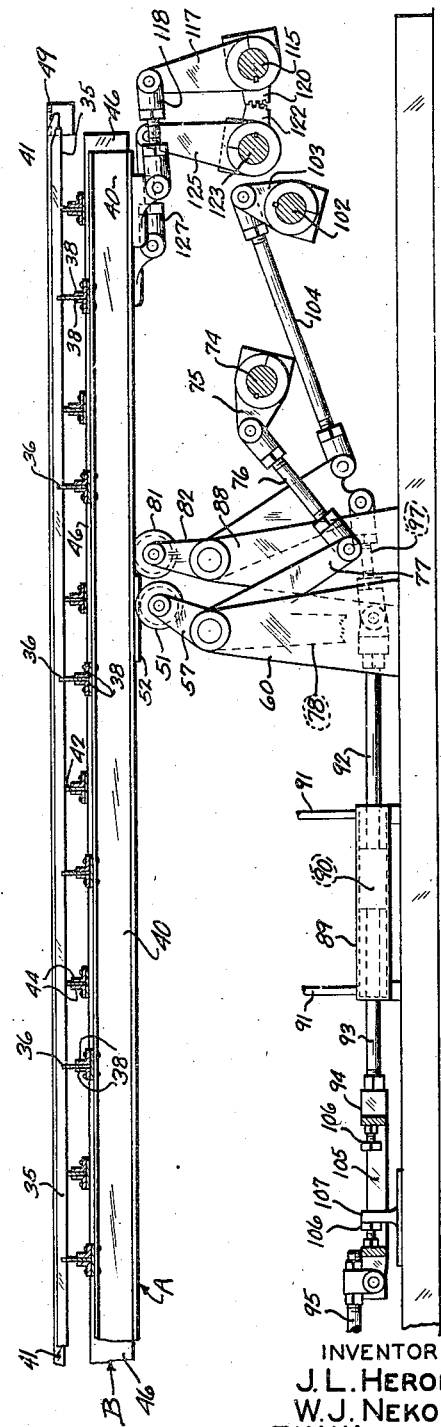
Fig. 7 is an enlarged fragmentary section of the details of the apparatus shown at the right hand portion of Fig. 2.

The lower portion of the levers 85 to 87 for raising and lowering the beam 45 of the support B are pivotally connected to each other by means of rods 98 and 99, as shown in Fig. 4. The lower portion of the lever 85 is also pivotally connected by a link 100 to an arm 101 fixed on a shaft 102. This shaft extends across the machine, as shown in Fig. 8 and has an arm 103 fixed thereto. A link 104 connects the arm 103 to the lower arm of the lever 82, as shown in Fig. 7. The levers 82 to 87 are, therefore, driven in unison with each other to raise and lower the beams 45 and 46 of the support B.

To limit the upward and downward movements of the supports A and B, each of the driven members 68 and 94 which are reciprocated by the pistons 64 and 90, is provided with an elongated slot 105, as shown in Figs. 6, 7 and 8. At opposite ends of each slot, adjustable stop members 106 are screwed into each driven member. A fixed abutment 107 extends into each of the slots 105 and cooperates with the stop members 106 to limit the reciprocal movements of each of the driven members 68 and 94.

As an illustration of a suitable means for moving the supports A and B forwardly and backwardly, we have shown a piston 108 in a cylinder 109 (Fig. 6), provided with pipes 110 for the admission and discharge of fluid to reciprocate said piston 108. The piston 108 is provided with an operating rod 111 extending through an end of the cylinder. This rod 111 is provided with a driven member 112 which is connected by a link 113 to the lower end of a lever 114 fixed to a shaft 115. The upper end of the lever 114 is pivotally connected by a link 116 to the beam 39 of the support A. The shaft 115, as shown in Fig. 8, extends across the machine and is provided with an arm 117 (Fig. 7) which is pivotally connected by a link 118 to the other beam 40 of the support A. The movement of the piston 108 to the left from the position shown in Fig. 6 will, therefore, shift the support A forwardly, to the right. When the piston 108 moves back to the position shown in Fig. 6, the support A will move backwardly to return the support to the position shown in Fig. 6.

The support B moves simultaneously with the support A but in opposite directions. While the support A is moving forwardly the support B is moving rearwardly, and likewise the support A moves rearwardly while the support B is moving forwardly.

The means for driving the support B simultaneously with the support A but in said opposite directions include segmental gears 119 and 120 fixed to opposite ends of the shaft 115 and meshing with segmental gears 121 and 122 fixed on the ends of a shaft 123, as shown in Figs. 6, 7 and 8. Arms 124 and 125 are secured to opposite ends of the shaft 123. The arm 124 (Fig. 6) is connected by a link 126 to the beam 45 of the support B, and the arm 125 at the other end of the shaft 123 (Fig. 7) is connected by a link 127 to the other beam 46 of the support B.

To limit the forward and backward movements of each support, we have shown in Fig. 6 an adjustable stop device, which includes adjustable stop members in the form of screws 128 at opposite ends of an elongated slot 129 in the driven member 112. A fixed abutment 130 extends into said slot and cooperates with said adjustable stop members to limit the movements of said driven member.

We will now refer to the operation of the supports A and B in advancing the bottles from the inlet conveyor 33 to the discharge conveyor 34. Each of said supports is movable in an endless cycle upwardly to a bottle-supporting position, forwardly to advance the bottles, downwardly out of contact with the bottles, and rearwardly to a retracted position.

In Figs. 12 to 17 we have illustrated various positions of the supports A and B during their movements in said endless cycles. These views are merely diagrammatical illustrations and the details of construction have been omitted to more clearly illustrate the movements of said supports A and B.

In Fig. 12 the upper support B which is in a bottle-supporting position is at the end of its forward stroke and at rest, while the lower support A is at the end of its rearward stroke. From the position shown in Fig. 12, the support A is moved upwardly to a bottle-supporting position flush with the other support B, as shown in Fig. 13. Thereafter, the support B is lowered so that the support A alone supports the bottles.

After the support B is lowered to the position shown in Fig. 14, the upper support A is driven forwardly to advance the bottles and the lower support B is simultaneously moved to a retracted position, such as is illustrated in Fig. 15. The lower support B is then moved upwardly to a bottle-supporting position flush with the support A, as illustrated in Fig. 16. Thereafter, the support A is lowered to a position such as is shown in Fig. 17, where it is out of contact with the bottles. The upper support B is then moved forwardly to advance the articles while the lower support is moving rearwardly to a retracted position, such as is shown in Fig. 12.

The supports A and B are continuously driven in the endless cycles heretofore described to alternately advance the bottles step by step from the conveyor 33 to the conveyor 34.

It will be observed that the bottles are moved in a substantially straight plane by the supports A and B. In other words, the bottles are not subjected to repeated objectionable raising and lowering operations as they are transferred from one support to the other. During the transferring operation, the support to be lowered out of a bottle-supporting position is not moved downwardly until the other support has been moved to a bottle-supporting position, where the top faces of both supports are flush with each other and support the bottles.

Another advantage appears in the efficient manner in which our apparatus conveys articles through zones of different temperatures without causing undesirable variations in the temperatures of the conveying mechanism. For example, the supports A and B transmit the bottles through various different temperature zones in the pasteurizer, but the forward and backward movement of the supports is very limited so that any particular portion of said supports remains at substantially the same temperature.

The processes of pasteurizing herein disclosed are claimed in an application filed by us on September 13, 1941, for Methods of pasteurizing liquids in containers, Serial No. 410,786, and an application filed by us on August 11, 1939, for Processes of pasteurizing liquids in containers, Serial No. 289,512.

We claim:

1. An apparatus for conveying articles in a straight plane which comprises a pair of supports for alternately advancing the articles, each support being movable limited distances upwardly, forwardly, downwardly and rearwardly in an endless cycle, means for moving one of said supports forwardly to advance the articles while simultaneously moving the other support rearwardly to a retracted position, means for raising each support from its retracted position to an article-supporting position flush with the other support, said last mentioned means being adapted to lower each support after it has completed its forward stroke and the other support has been moved upwardly to an article-supporting position, and an adjustable stop device for limiting the upward movement of each support to prevent a vertical displacement of the articles.

2. An apparatus for conveying articles in a straight plane which comprises a pair of supports for alternately advancing the articles, each support being movable limited distances upwardly, forwardly, downwardly and rearwardly in an endless cycle, means for moving one of said supports forwardly to advance the articles while simultaneously moving the other support rearwardly to a retracted position, an adjustable stop device for limiting the forward and rearward movements of said supports, means for raising each support from its retracted position to an article-supporting position flush with the other support, said last mentioned means being adapted to lower each support after it has completed its forward stroke and the other support has been moved upwardly to an article-supporting position, and an adjustable stop device for limiting the upward movement of each support to prevent a vertical displacement of the articles.

3. In an apparatus for conveying articles, a support movable in an endless cycle upward to an article-supporting position, forwardly to advance the articles, downwardly out of contact with the articles, and rearwardly to a retracted position, another support also movable in an endless cycle upwardly to an article supporting position when the first mentioned support is at the end of its forward stroke and at rest, forwardly while said first mentioned support is moving rearwardly, downwardly after said first mentioned support is moved upward, and rearwardly while said first mentioned support is moving forwardly, and means for driving said supports in said endless cycles to alternately advance the articles step by step.

4. In an apparatus for conveying articles, a support movable in an endless cycle upward to an article-supporting position, forwardly to advance the articles, downwardly out of contact with the articles, and rearwardly to a retracted position, another support also movable in an endless cycle upwardly to an article supporting position when the first mentioned support is at the end of its forward stroke, forwardly while said first mentioned support is moving rearwardly, downwardly after said first mentioned support is moved upward and before the first mentioned support is moved forwardly, and rearwardly while said first mentioned support is moving forwardly, and means for driving said supports in said endless cycles to alternately advance the articels step by step.

5. In an apparatus for conveying articles, a support movable in an endless cycle upward to an article-supporting position, forwardly to advance the articles, downwardly out of contact with the articles, and rearwardly to a retracted position, another support also movable in an endless cycle upwardly to an article supporting position when the first mentioned support is at the end of its forward stroke and at rest, forwardly while said first mentioned support is moving rearwardly, downwardly after said first mentioned support is moved upward and before the first mentioned support is moved forwardly, and rearwardly while said first mentioned support is moving forwardly, and means for driving said supports in said endless cycles to alternately advance the articles step by step.

JAMES L. HEROLD.
WILLIAM J. NEKOLA.
FREDERICK W. WEHMILLER.